Patented Aug. 31, 1926.

1,598,104

UNITED STATES PATENT OFFICE.

HAROLD ROBERT RAFSKY, OF LAWRENCE, MASSACHUSETTS; NOW BY JUDICIAL CHANGE OF NAME HAROLD ROBERT RAFTON.

PRODUCT OF MANUFACTURE.

No Drawing.   Application filed April 4, 1921. Serial No. 458,523.

My invention relates to a new and useful product of manufacture.

In the manufacture of paper or other fibrous products, various kinds of fibrous materials of vegetable or animal or mineral origin, organic or inorganic, are used, such as mechanical and chemical wood pulps, rag pulp, esparto pulp, straw pulp, jute, hemp, asbestos and the like, or mixtures of one or more of these.

These fibrous substances, organic or inorganic, may be admixed with one or more other substances such as loading or filler, size, size precipitant, coloring matter, and such other materials as may enter into the composition of the paper or fibrous product. After sufficient treatment in the heating engine, or such other machine or machines as are commonly employed in the manufacture of the desired article, the material is put through the subsequent necessary processes and apparatus and finally run out on a Fourdrinier or cylinder paper or board machine or into various forming or molding devices or machines for subsequent treatment accordingly as paper or other fibrous products are to be made.

My new and improved product of manufacture includes in its composition a filler or loading material consisting essentially of calcium carbonate ($CaCO_3$) and magnesium hydroxide ($Mg(OH)_2$), in an extremely minute state of subdivision, which is substituted for the filler or loading materials now commonly employed in the manufacture of the products outlined above. Of course, if desired, other fillers may be incorporated with my filler in any desired ratio, but inasmuch as I desire to secure the maximum beneficial results from the use of my filler in my fibrous product, I prefer to use it as the only filling constituent employed. The production of this filler or loading material consisting essentially of calcium carbonate and magnesium hydroxide in an extremely minute state of subdivision, is described in my two copending applications: White Pigment, Serial No. 87,624, filed March 29, 1916; now Patent No. 1,415,391, granted May 9, 1922; and in my application for a process of manufacturing a composition of matter, filed April 4, 1921, Serial No. 458,522.

Whereas in my product I use as a filler or loading material a composition of matter composed essentially of calcium carbonate and magnesium hydroxide, it is to be understood that in this filler, small amounts of other substances may be present according to the purity of the raw materials employed in its manufacture and such variations as might normally be expected in ordinary commercial practice, and according to the process by which my material is made.

In the manufacture of one variation of my product my filler is added to the pulp in the beater or other similar or compounding or mixing machine, in any suitable proportion to give the desired finished product. There may be admixed at this point, also, suitable sizing agent or agents, and such other substances which are to enter into the composition of the finished product, but the chief constituents of my product are the fibrous substances and the filler consisting essentially of calcium carbonate and magnesium hydroxide in an extremely minute state of subdivision.

The addition of the suitable sizing agent or agents or size precipitant may be omitted in whole or in part at this stage of the process. The sizing agent or agents or size precipitant or all of these may or may not be incorporated at a point later in the process, as in the case of a paper, by the vat, tub, or animal sizing process, or by any process for surface sizing either directly on the paper machine or applied later; or in the case of a molded product, by any suitable size applying device; accordingly as a sized or unsized paper or fibrous product is desired.

My paper or other fibrous product, comprising the fibrous material, filler and such other ingredients as are suitable in this class of products can be produced more cheaply than similar products produced with fillers now commonly employed. This will give it a decided economic advantage over products of this type now on the market. Moreover, if the filler is made of suitably selected raw materials, it may be made of a high white color, which will enhance the color of the finished product. Moreover, because of the homogeneity and extreme fineness of the filler, the resulting product is in itself more homogeneous and uniform in quality than is the case where other now commonly employed fillers are used. Furthermore, my paper, or fibrous product, is more opaque than articles of this class now made, as the filler possesses greater opacity than common fillers now used which quality it imparts to the paper or fibrous product.

When the fibrous product consists of an inorganic fibrous constituent and the filler indicated, an excellent heat insulating material is produced.

Of course, it is not my intention to include, in the above indicated examples of my invention, paper surface coated with my material and claimed in my copending application Serial No. 184,825, filed August 7, 1917, (now Patent No. 1,374,112, dated April 5, 1921); and I, therefore, hereby specifically exclude from the scope of this application, paper which is of the kind commercially known as coated paper. I do not, however, hereby exclude from the scope of this application, the "body stock" from which coated papers are made. (This "body stock" or "raw stock," as it is sometimes called, is, of course, the paper to which the coating is applied in the manufacture of coated paper).

By the expression, "extremely minute state of subdivision", I mean to include not only the case in which the ultimate particles are in a state of microscopically minute subdivision, but also that in which they are of such minuteness that they may be said to approach or be in the colloidal condition.

The material which I use as a filler is of such fine grain that it will not settle readily in the ordinary course of manufacture, but has to be filterpressed. The ordinary calcium carbonate resulting from the softening or treatment of water containing bicarbonate of lime by means of caustic lime, which process is known as the "Clarke process", if of coarse grain, and is a relatively quick settling material. Likewise, the ordinary calcium carbonate produced in the ordinary process of causticizing sodium carbonate with lime (calcium oxide) if of coarse grain, and is a relatively quick settling material. Both of these latter materials are entirely distinct from, and easily distinguished from, my extremely fine grain material which I use as a filler. However, to avoid the possibility of confusing the filler which I use with the two materials mentioned immediately above, I specifically exclude from the scope of this application, paper filled with the ordinary coarse grain relatively quick settling calcium carbonates obtained either from the Clarke process of water softening described above, or from the ordinary process of causticizing sodium carbonate with lime (calcium oxide), even though such calcium carbonates may contain fortuitous traces of magnesia as an impurity.

Paper and fibrous products in this specification are taken to mean paper, card, and board stocks of all types and all weights,— such as may be produced on Fourdrinier and cylinder paper or board machines,—and other artificial products which contain as an essential constituent a considerable amount of prepared organic or inorganic fibre.

It is understood, of course, that the order of steps, methods of procedure and details for the manufacture of my paper or fibrous product as outlined above, are to be taken as preferred examples thereof, and that various changes may be resorted to in the practice of my invention without departing from the spirit of my invention or the scope of the subjoined claims.

Having thus described my invention, I claim:

1. A product of manufacture comprising fibrous material and a filler or loading consisting of a composition of matter composed of calcium carbonate and magnesium hydroxide, in an extremely minute state of subdivision.

2. A product of manufacture comprising organic fibrous material and a filler or loading consisting of a composition of matter composed of calcium carbonate and magnesium hydroxide, in an extremely minute state of subdivision.

3. A product of manufacture comprising fibrous material having incorporated in it essentially uniformly throughout a filler or loading consisting of a composition of matter composed of calcium carbonate and magnesium hydroxide, in an extremely minute state of subdivision.

4. A product of manufacture comprising fibrous material and a filler or loading consisting of a composition of matter composed of calcium carbonate and magnesium hydroxide, in an extremely minute state of subdivision, and sizing.

5. A product of manufacture comprising a paper having incorporated in it a filler or loading consisting of a composition of matter composed of calcium carbonate and magnesium hydroxide, in an extremely minute state of subdivision.

6. A product of manufacture comprising a sized paper having incorporated in it a filler or loading consisting of a composition of matter composed of calcium carbonate and magnesium hydroxide, in an extremely minute state of subdivision.

7. A product of manufacture comprising a paper having incorporated in it a filler or loading consisting of a composition of matter composed of calcium carbonate and magnesium hydroxide, in an extremely minute state of subdivision, and sized on its surface.

8. A product of manufacture comprising a sized paper having incorporated in it a filler or loading consisting of a composition of matter composed of calcium carbonate and magnesium hydroxide, in an extremely minute state of subdivision, and sizing and, in addition, being sized on its surface.

9. A paper comprising fibrous material and a filler or loading incorporated essentially uniformly throughout consisting of a composition of matter composed of calcium carbonate and magnesium hydroxide, in an extremely minute state of subdivision, and sizing.

10. A paper comprising fibrous material and a filler or loading incorporated essentially uniformly throughout consisting of a composition of matter composed of calcium carbonate and magnesium hydroxide, in an extremely minute state of subdivision, and sizing incorporated uniformly throughout.

11. A paper comprising fibrous material and a filler or loading incorporated essentially uniformly throughout consisting of a composition of matter composed of calcium carbonate and magnesium hydroxide, in an extremely minute state of subdivision, and sizing on the surface thereof.

12. A paper comprising fibrous material and a filler or loading incorporated essentially uniformly throughout consisting of a composition of matter composed of calcium carbonate and magnesium hydroxide, in an extremely minute state of subdivision, sizing incorporated uniformly throughout and, in addition, sizing on the surface thereof.

In testimony whereof I affix my signature.

HAROLD ROBERT RAFSKY,
*Now by Judicial Change of Name Harold R. Rafton.*